United States Patent Office 2,818,636
Patented Jan. 7, 1958

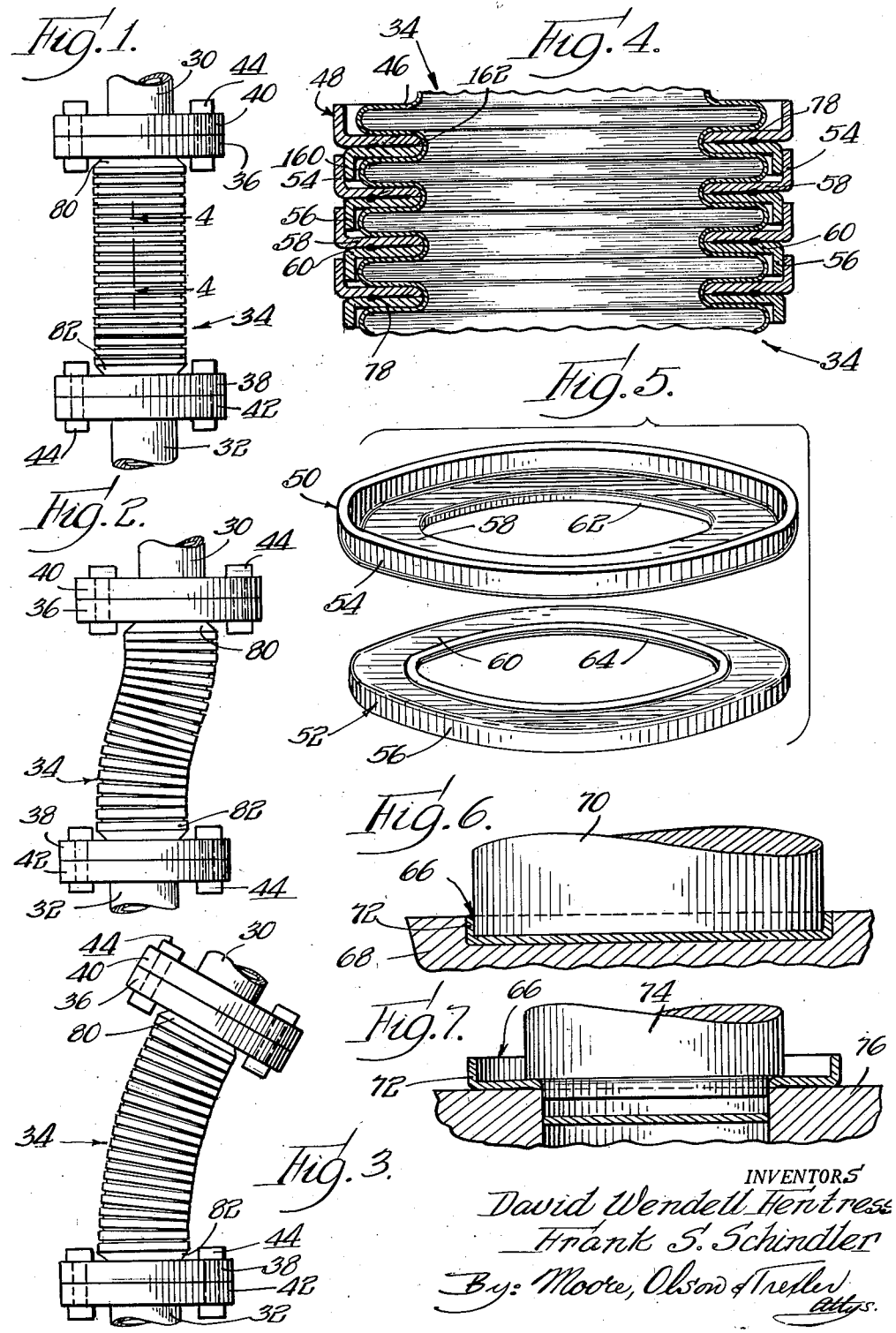

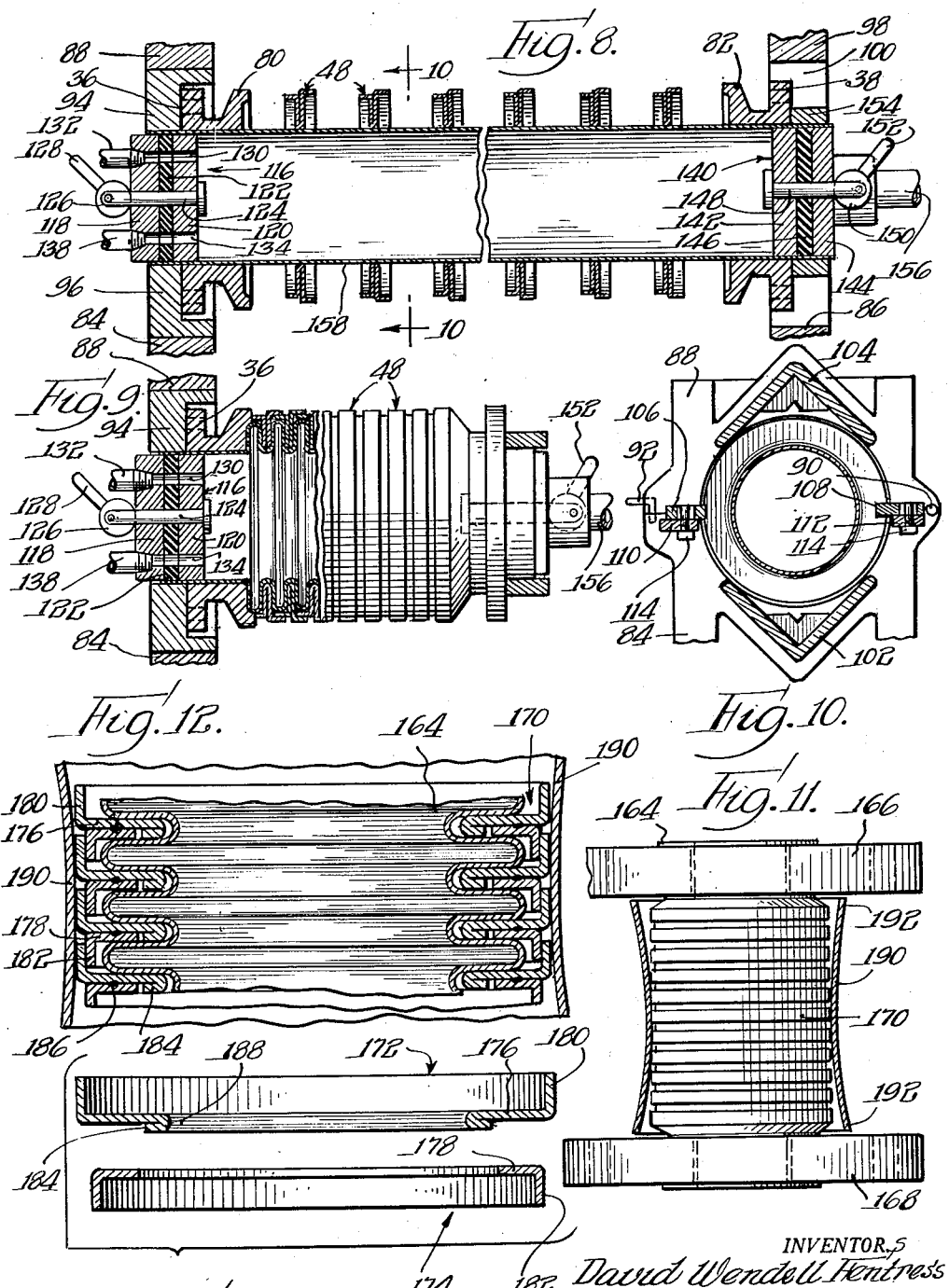

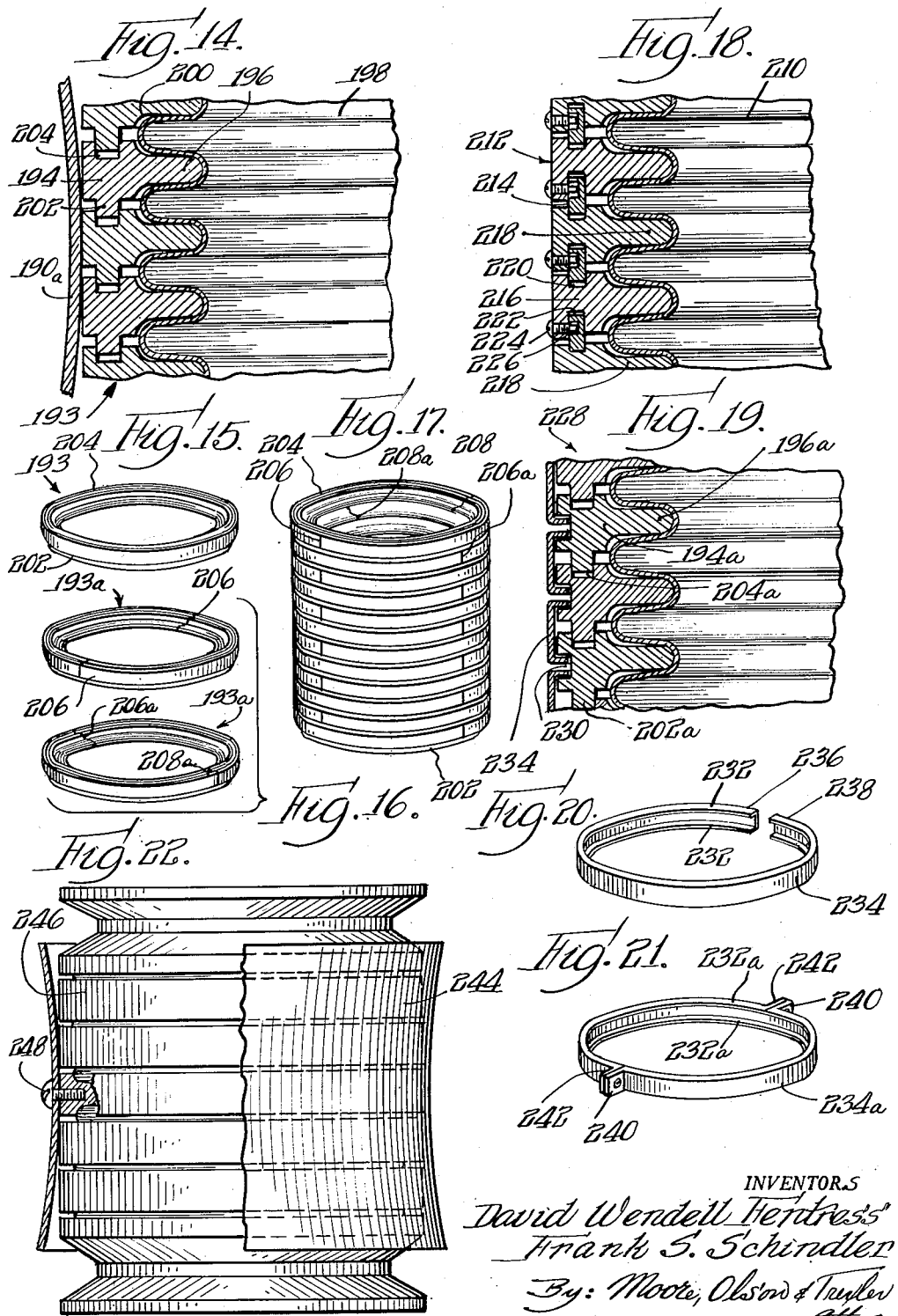

2,818,636
METHOD OF MANUFACTURING REINFORCED FLEXIBLE CONDUIT

David Wendell Fentress, Barrington, and Frank S. Schindler, Elgin, Ill., assignors to Chicago Metal Hose Corporation, Maywood, Ill., a corporation of Illinois Application May 26, 1949, Serial No. 95,474

3 Claims. (Cl. 29—454)

This invention relates to flexible expansion joints for conduits, pipe lines and the like, and more particularly to expansion joints for use in high pressure assemblies.

In the conventional application of conduit expansion joints the flexible or expansion member is inserted coaxially between two adjacent relatively rigid pipe sections so as to absorb the relative motion therebetween resulting from thermal expansion and contraction of the rigid pipe sections or other causes inducing relative motion. In larger sizes of expansion joints and particularly when the conduit must withstand high fluid pressures, reinforcing means have been applied to the conduit structure for enabling the flexible member or structure to resist the high pressure forces involved. These reinforcing means often take the form of rings which are disposed in embracing relation to the convolutions of the flexible member so as to control the operation of the member and aid in resisting the forces exerted by the internal bursting fluid pressures. In expansion joints, for example, the flexible member usually comprises a thin wall annularly corrugated flexible conduit piece, the annular corrugations being embraced by reinforcing rings which may be positioned on the flexible member before it is corrugated or the rings may be formed as complemental half circular pieces which are suitably bolted together in position around the flexible member after it is corrugated.

The fabrication of the second type of unit is costly and is moreover subject to certain difficulties such for example as the weakening of the reinforcement rings by the bolt holes, the unbalance of the bolt connections, the difficulty of fabricating bolts and associated parts from special non-corrosive metals, and other unsatisfactory conditions induced by the nature and method of assembly of the parts.

The reinforcing means used heretofore, such as the ones mentioned above, do not limit certain of the motions encountered in flexible joints of the type described as is desirable in certain applications. As pointed out above, reinforcing means known in the art cannot be applied to the flexible member after the flexible member has been connected in the conduit without resorting to the use of bolts and associated parts. For the reasons pointed out above it is often desirable to apply reinforcing rings which do not need bolts for their attachment about the flexible member in installations in which the flexible member has been connected in the conduit.

In accordance with the present invention reinforcement rings are provided which permit axial compression and elongation, axial rotation, bending, offset motion or combinations thereof and which will limit one or more of these motions within predetermined bounds; certain forms of these rings are so constructed that they may be applied to a conduit after it has been installed without the use of bolts and associated parts. In addition reinforcing rings or a reinforcing sleeve or a combination of rings and a sleeve are provided which will permit one or more of the above named motions and which will positively limit or prevent lateral distortion of the flexible member.

Accordingly it is an object of the present invention to provide an expansion joint structure of improved construction and improved operating characteristics, and the method of making the same.

More specifically stated, it is an object of the present invention to provide an expansion joint assembly particularly for high pressure conduits and pipes wherein means are provided for limiting one or more of the motions encountered in such joints.

A further object of the invention is to provide an improved expansion joint particularly for high pressure use which positively limits lateral distortion of the flexible member.

Another object of the invention is to provide improved reinforcing means for the flexible member of an expansion joint which reinforcing means may be applied to a flexible member positioned in a conduit without the use of bolts or similar fastening means.

Yet another object of the invention is to provide an improved expansion joint in which adjacent reinforcing rings move each other into position when the flexible member is moved.

A still further object of the invention is to provide reinforcing rings for an improved expansion joint which rings are more easily and economically constructed, and the method of making the same.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Figure 1 is a general assembly view of an expansion joint embodying the principles of the present invention in accordance with one preferred embodiment thereof shown connected in a high pressure conduit;

Figure 2 is a view similar to Figure 1 showing the manner in which the expansion joint of the present invention permits offset motion between the ends of the joined pipes;

Figure 3 is a view similar to Figure 1 showing the manner in which an expansion joint made in accordance with the present invention permits radial motion;

Figure 4 is an enlarged cross sectional view of a portion of the expansion joint shown in Figure 1 as seen in the direction of the arrows 4—4;

Figure 5 is a perspective view of the two elements which form the reinforcing members of one embodiment of the invention;

Figure 6 shows one step in the manufacture of the reinforcing elements shown in Figure 5;

Figure 7 shows another step in the manufacture of the reinforcing elements shown in Figure 5;

Figure 8 is a cross sectional view of the apparatus for making an expansion joint according to one embodiment of the present invention;

Figure 9 is a side view, partially in cross section, of the apparatus shown in Figure 8 with the apparatus illustrated in another position of operation;

Figure 10 is a cross sectional view of the apparatus shown in Figure 8 as seen in the direction arrows along the line 10—10;

Figure 11 is a side view partially in cross section of another embodiment of the present invention and illustrating the use of a guide sleeve;

Figure 12 is an enlarged cross sectional view of the embodiment of the invention shown in Figurue 11 as seen in the direction of the arrows 12—12;

Figure 13 is a cross sectional view of the elements which form the reinforcing member shown in Figures 11 and 12;

Figure 14 is a partial cross sectional view of another embodiment of the present invention;

Figure 15 is a perspective view of one of the reinforcing rings shown in Figure 14 and illustrated as having a continuous circumference;

Figure 16 is a view similar to Figure 15 illustrating the manner in which the reinforcing ring is split to facilitate assembly of the ring around the reinforcing element;

Figure 17 is a perspective view of an assembly of rings such as those shown in Figures 14 to 16 illustrating the manner in which the rings are interlocked in assembly about a flexible member;

Figure 18 is a partial cross sectional view of another embodiment of the present invention and illustrating one form of motion limiting structure;

Figure 19 is a partial cross sectional view showing yet another form of the present invention and illustrating another form of motion limiting structure;

Figure 20 is a perspective view of one of the motion limiting bands shown in Figure 19;

Figure 21 is a perspective view illustrating a second embodiment of the motion limiting band shown in Figure 19; and Figure 22 is a side view, partially in cross section, illustrating the general application of a retaining sleeve.

Referring more specifically to the drawings, in Figure 1 there is illustrated a pipe line installation comprising a first pipe section 30 and a second pipe section 32 interconnected by means of an expansion joint or assembly generally indicated by the numeral 34. The expansion joint 34 has attached at each end thereof an end member or flange 36 and 38 by means of which the unit is interconnected with the adjacent conduit parts. Pipe sections 30 and 32 carry flanges 40 and 42, respectively, which are joined to the flanges 36 and 38 by any suitable means such as bolts 44. Figure 4 is an enlarged cross sectional view of the expansion member and from this figure it can be seen that the expansion assembly 34 comprises an annularly corrugated flexible tubing 46 about which are arranged a plurality of reinforcing elements 48.

As may be seen from Figures 4 and 5, the reinforcing elements 48 comprise two disc-like ring members 50 and 52 which are generally circular in shape. Formed on the outer circumference of the rings 50 and 52 are flanges 54 and 56, respectively, which are bent at approximately a right angle with respect to the central body portions 58 and 60. The outside diameter of flange 56 is somewhat smaller than the inside diameter of flange 54 whereby flange 56 may be fitted within flange 54 when the rings 50 and 52 are positioned about the convolutions of the tubing 46. The body portions 58 and 60 have formed at their center circular apertures which are of sufficient diameter so that the diameter of the recessed or trough portions of the corrugation of the tubing 56 can be contained therein. The edges 62 and 64 of the apertures in the rings 50 and 52 are bevelled in an arcuate manner so that they conform to the shape of the trough of the convolutions in tubing 46.

The rings 50 and 52 may be formed in any suitable manner such as by spinning or stamping. Figures 6 and 7 illustrate one method of stamping these rings. In Figure 6 a circularly shaped blank 66 is shown positioned in a die 68 with the hammer 70 positioned at the end of its stroke after forming the flange 72. Figure 7 illustrates the formation of the aperture in the blank 66 by the action of a stamping tool 74 cooperating with a recessed die member 76. The tool 74 is so shaped that it simultaneously punches the aperture in the blank 66 and at the end of the stroke bevels the edge of the aperture in an arcuate manner for the reason described above. Any other suitable manner of forming the rings 50 and 52 may be used, the method of Figures 6 and 7 being shown only for purposes of illustration.

The rings 50 and 52 may be applied to the tubing 46 in the form shown in Figure 5 or they may be fastened together in pairs such as by welding at point 78 as shown in Figure 4. It is apparent that the tubing 46 must be corrugated or formed into the shape shown in Figure 4 with the rings 50 and 52 in position since the rings are illustrated as having a continuous circumference.

Figures 8 through 10 illustrate an apparatus for forming an expansion joint 34 having integral rings encircling the convolutions of the tubing 46. The conduit piece which is to be shaped into the tubing 46 is preferably made of a suitable metal, plastic, or other material having the desired physical properties for the installation to be made and may be drawn or fabricated from flat sheet stock bent into cylindrical shape and in the case of metal longitudinally seam-welded. In addition to the reinforcing rings 48 the assembly is provided with end reinforcing members 80, 82 which, if desired, may be formed integral with the connecting flanges 36 and 38, respectively.

The apparatus illustrated in Figures 8 through 10 is more fully set forth and described in the copending application of Frank S. Schindler and Richard K. Titus for a "Reinforced Flexible Conduit and Method of Manufacture," Serial No. 8,116, now Patent No. 2,644,487, granted July 7, 1953. Referring to Figures 8, 9 and 10, the apparatus comprises a pair of pedestals 84 and 86 disposed at the opposite ends thereof. The pedestal 84 is divided into a lower stationary portion and a hinged upper portion 88 pivotally mounted upon the lower portion as indicated at 90 in Figure 10. A clamping control handle 92 is provided for locking and unlocking the upper hinged portion 88 for pivotal movement. Clamping members 94 and 96 are carried, respectively, by the upper and lower pedestal members, the clamping members being removably secured to the pedestal members and being of a size and shape to conform with the particular conduit structure to be formed.

The pedestal 86 is also provided with an upper hinged portion as indicated at 98, similar hinge connections and control being provided to correspond to parts 90 and 92 previously described. Instead of carrying clamping members as do the pedestal portions 84 and 88, the pedestal portions 86 and 98 are cut away to provide an enlarged central opening 100 for a purpose which will presently appear.

A V-shaped guide and support member 102 extends between and is supported by the fixed pedestals 84 and 86 and a similarly shaped guide member 104 extends between and is supported by the hinged pedestal members 88 and 98. As may be seen in Figure 10, the fixed pedestals also support a pair of spacing or templet bars 106, 108 which are positioned on opposite sides of the pedestal structures. The spacing bars are carried by a pair of longitudinal frame supports 110 and 112 which are loosely held in position by pins or bolts 114 which are attached to the supports 84 and 86.

Referring to Figures 8 and 9, it will be seen that there is provided a clamping plug generally designated by the numeral 116 which is adapted to be positioned between the cooperating dies 94 and 96. The clamping plug 116 comprises a pair of plates 118 and 120 between which is placed a plate or sheet of rubber 122. A bolt 124 extends through the plug assembly and has pivoted at its outer end a cam 126 which may be actuated by a handle 128. The parts are so arranged that upon manipulation of the handle 128 the plates 118 and 120 are pressed relatively toward each other so as to compress the rubber member 122 whereby to radially expand it into clamping engagement toward the split die members 94 and 96. The plug 116 is provided with a passage 130 which interconnects with a liquid supply conduit 132 leading from a suitable pressure reservoir and a passage 134 interconnecting with an air escape or exhaust conduit 138.

Positioned at the other end of the conduit assembly is a second plug member 140 whose structure is similar to that of plug member 116. The second plug member comprises a pair of metal plates 142, 144 between which is placed a plate 146 of rubber or similar material. A bolt 148 operable by means of a cam 150 and a handle 152 is provided to effect the radial expansion of the rubber plate 146 in a manner similar to that described for the first plug member. The rubber plate 146 cooperates with a ring 154 which encircles the second plug member. Plug 140 is carried by the end of a piston ram 156 which is adapted to be connected to a suitable cylinder and piston structure (not shown) by which the piston rod may be propelled in an axial direction.

In fabricating a reinforced flexible conduit using the apparatus shown in Figures 8 to 10, a cylinder blank 158 is mounted within the forming apparatus with the reinforcement rings 48 embracing the blank in predetermined spaced relation. In addition to the intermediate rings 48 the number of which is determined by the length and desired physical characteristics of the completed unit, the end flanged reinforcing rings 80 and 82 are arranged at either end of the structure. The templet bars 106 and 108 effect a rapid and proper axial placement of the rings. The plug members 116 and 114 are next placed in position in the opposite ends of the cylinder blank and the ring 154 is arranged in embracing relation around the plug 140.

The hinged pedestal sections 88 and 98 are clamped in position and the handles 128 and 152 are manipulated so that the plugs grip the opposite ends of the cylinder blank. The templet bars 106 and 108 are then withdrawn after which liquid under pressure is introduced into the interior of the cylinder blank 158 by means of the pressure conduit 138 and the associated passage 134. As the hydraulic pressure is applied, axial force is also imparted to the piston rod 156 whereby to effect a radial expansion and axial collapse of the wall sections of the blank 158 at spaced intervals so as to form annular corrugations therein. Figure 9 shows the relation of the various parts after the corrugating or forming operation is completed. As may be seen from Figures 4 and 9, the interior surfaces of the rings 48 predetermine the shape of the convolution walls at the trough of the convolutions and are therefore rounded as explained above to produce a corrugation configuration having maximum strength.

Upon release of the hydraulic pressure, withdrawal of the plugs 116 and 140, and opening of the pedestal hinge sections 88 and 98, the assembled expansion unit comprising corrugated tubing 46 and the integral rings 48 may be removed from the apparatus. The unit is completed by flanging each end of the blank 158 over and onto the end face of its associated flange members 80 and 82. It also is desirable to impart a slight axial pulling force to each end of the blank so as to effect a slight separation of the rings 48.

It will be seen from Figures 1 and 4 that assembly 34 may partake of axial extension, compression and rotation. The amount of extension is limited only by the strength and flexibilty of the tubing 46 but the amount of compression is definitely limited by the construction of the rings 48. Compression of the tubing 46 is effectively stopped when the exposed edges of all the flanges 56 are pressed into abutting relationship with the adjacent body portion 58. This construction prevents the possibility of a collapse of the external convolutions 160 and the inner rounded portion of the rings 48 effectively prevents the collapse and eventual breakage of the inner convolutions 162.

As illustrated in Figure 2, the form of reinforcing ring shown in Figures 1 through 5 also permits offset motion between the conduits 30 and 32. The overlapping construction of the reinforcing rings 48 however limits the amount of offset motion which may be had between the conduit sections 30 and 32.

When the expansion joint is subjected to motion such as offset motion or a related motion the flanges 54 and 56 of adjacent rings drag each other into position instead of depending upon the wall of the corrugated tubing 46 to shift the rings into the new position. For example, as conduit 30 is moving to the right with respect to conduit section 32, the flange reinforcing ring 80 is moved to the right by conduit 30 and in turn moves the reinforcing ring below it by virtue of the interlocking flanges 54 and 56. This type of motion is transmitted through the length of the expansion joint and as pointed out above effectively removes the strain of shifting the rings into the new position from the corrugated tubing 46. In the reinforcing rings used heretofore the rings were shifted to a new position by the corrugated flexible member and hence demanded a greater strength in this member than the present reinforcing ring structure.

The ring structure 48 also allows radial bending motion as illustrated in Figure 3. The interlocking engagement between the flanges 56 and the body portions 58 limits the amount of compression which can take place on the inside or smaller radius of the band. Lateral distortion or "blow out" of the corrugated tubing 46 will be controlled and limited by the same interlocking action. This feature is especially important when the pressure within the tube 46 is very high.

The overlapping flanges 54 and 56 completely surround and protect the relatively fragile corrugated tube 46. Reinforcing rings 48 thereby protect the tube 46 from accidental blows from a wrench or the like. Another important advantage is achieved by the use of overlapping flanges in that should the tubing 46 rupture under high pressure the material contained in the tubing will not issue as a steady, intense stream. Instead any streams which would tend to form will be broken up by the overlapping flanges and the material will be forced to diffuse relatively slowly between the overlapping flanges. This feature may be extremely important in the case of high temperature fluids or corrosive fluids.

Since the reinforcing elements 50 and 52 may be formed by inexpensive methods of fabrication such as spinning or stamping, the resultant extension joint can be produced very economically. The elimination of bolts and associated parts for assembling the reinforcing rings about the flexible member also reduces the cost of the installation and obviates the difficulties outlined above.

Another expansion joint having interlocking reinforcing rings associated therewith and illustrating a second embodiment of the invention is illustrated in Figures 11, 12 and 13. The annularly corrugated flexible tubing 164 and its associated flanges 166 and 168 are similar to the corresponding parts shown in Figures 4 and 5. The reinforcing elements generally designated by the numeral 170 comprise two disc-like ring members 172 and 174. The ring members 172 and 174 have circularly shaped body portions 176 and 178, respectively, which are generally circular in shape and which have formed on the outer periphery thereof laterally extending flanges 180 and 182, respectively. As may be seen in Figures 12 and 13, the circumference of the body portion 178 is smaller than the circumference of the body portion 176 whereby the flange 182 will fit within the flange 180 of the adjacent ring member 170. The ring member 172 has formed in the center thereof an aperture and the edge of the body member 176 which surrounds this circular aperture has formed thereon a reversely bent flange 184 which is bent to lie substantially parallel to the body portion 176. The ring member 174 also has an aperture formed in the center thereof which is of sufficient circumference so that the circumference of the reversely bent flange 184 may be received therein. It will be seen in Figure 12 that the ring members 172 and 174 when placed in the position shown form a completed ring reinforcing member 170. If desired, the rings may be welded together as indicated at the point 186 by spot welding or any other appropriate method.

When the rings 170 are in position on the flexible member 164 the smooth rounded edge 188 of the aperture in ring member 172 will lie within and embrace the trough of the inner convolutions of the flexible member 164. The assembly shown in Figures 11 and 12 will allow axial compression and extension between the flanges 166 and 168, offset motion and radial bending or combinations of these motions. As explained above with reference to the embodiment shown in Figures 1 to 5, the amount of axial compression, offset motion, and radial bending motion is limited by the contact between the free edge of flange 182 and the body portion 176 of the adjoining reinforcing ring. The ring 170 shown in Figures 11 to 13 may be formed by the spinning, stamping or other suitable methods of fabrication described above with reference to the first embodiment of the invention.

Figures 11 and 12 illustrate another feature of the present invention, namely, the utilization of a guide sleeve 190 to positively limit the amount of lateral distortion or "blow out" of the flexible member 164. As pointed out above, the limiting of such motion is especially important when the pressures within the flexible member are very high. The guide sleeve shown in Figure 11 is generally cylindrical in shape and has its ends flared or bell-shaped. The inside circumference of the guide sleeve 190 at the midpoint of its length is slightly greater than the diameter of the reinforcing ring 170 so that it fits over the reinforcing rings 170. The flared ends are of greater diameter than the midpoint of the sleeve so as to allow offset motion between the flanges 166 and 168 and radial bending motion. It will be seen that the amount of lateral distortion is limited and the limit of distortion is reached when the ends 192 of the guide 190 reach the reinforcing rings attached to the flanges 166 and 168.

A reinforcing sleeve such as that shown in Figure 11, may be applied to any type of reinforcing ring provided the reinforcing ring has no lateral projections or obstructions. Such a guide sleeve may be used on rings which have no interlocking characteristics as well as on interlocking rings. If the only type of motion to be encountered is axial extension and compression the guide sleeve may be a straight cylinder without the flared ends.

Figures 14 and 15 illustrate another form of interlocking reinforcing ring. These rings may have a continuous circumference as shown in Figure 15 or may be split into two substantially equal halves as shown in Figure 16. The cross section of the ring, as seen in Figure 14, comprises a central portion 194 on one side of which is formed a projection 196 which engages the trough of the convolutions of the flexible member 198. The juncture between the head portion 194 and the projection 196 is rounded at point 200 to conform to the shape of the outermost portion of the convolutions. Formed on the bottom of the central portion 194 is a downwardly projecting flange 202 which extends around the circumference of the reinforcing ring 193. Formed on the top of the central portion 194 is a flange receiving groove 204 which also extends around the circumference of the ring 193 and which is adapted to receive the downwardly projecting flange from the adjacent reinforcing ring. It is apparent that the flange 202 and the slot 204 of adjacent rings will cooperate to limit axial compression, lateral offset motion, radial bending motion and lateral distortion. A flared guide sleeve 190a is illustrated surrounding the reinforcing rings 193 to further aid in preventing lateral distortion.

Figure 16 illustrates a reinforcing ring 193a whose cross section is similar to that shown in Figure 14 but which is split on the circumference thereof to form two semicircular complementary portions. The split form of ring 193a may be applied to a flexible member after the corrugations have been formed thereon. These rings may be applied to a corrugated member by positioning the ring members as shown in Figure 17. The joints 206 and 208 between the complementary halves of the ring members 193a are staggered with respect to the adjacent rings. As shown in Figure 17, the joint 206 is displaced approximately 90° from the joint 206a and similarly joint 208 will be approximately 90° displaced from joint 208a. This manner of assembly is followed throughout the length of the flexible member and it will be seen that the cooperation between the flange 202 and the slots 204 will give an interlocked assembly.

It will be seen therefore that rings such as shown in Figures 16 and 17 may be applied to formed flexible members without the use of bolts or similar fastening devices. This construction allows repairs of expansion joints when they become injured and furthermore allows replacement of broken or injured reinforcing rings without disassembling the expansion joint. The elimination of bolts and their corresponding flanges makes it possible to use a guide sleeve to limit the lateral distortion or "blow out."

The embodiment of the invention shown in Figure 18 also is adapted to limit axial compression, lateral offset motion, axial bending and lateral distortion. The assembly comprises generally a flexible member 210, reinforcing rings 212 and keeper rings 214. The reinforcing rings 212 have a central portion 216 from which integrally and radially extends a projection 218 which fits into the trough of the convolutions in the flexible member 210. Formed on the upper and lower faces of the central portion 216 are slots 220 and 222 which are adapted to receive the keeper ring 214. One edge of the central portion 216 is threaded to receive a screw 224. When the reinforcing rings 212 and the keeper bands 214 are assembled, the screw 224 extends into an elongated slot 226 in the keeper ring 214.

The reinforcing rings 212 may be split or integral and if they are split it will be seen that the provision of the keeper bands 214 and the screws 224 will positively hold the reinforcing rings 212 in the assembled position. The reinforcing ring shown in this form of the invention therefore may also be applied to a flexible member while it is in position in a conduit. This structure facilitates repair and replacement of broken or damaged reinforcing rings.

The embodiment of the invention shown in Figure 19, in addition to limiting axial compression, lateral offset motion, radial bending and lateral distortion, is designed to limit axial extension. The cross section of the reinforcing rings 228 is similar to that of ring 193 shown in Figure 14. The reinforcing ring 228 comprises a laterally extending flange 196a and a central portion 194a which has formed thereon a flange 202a and a flange receiving groove 204a. Formed on the outer circumference of the central portion 194a is a slot 230 which extends completely around the reinforcing ring. The slots 230 in adjacent rings are each adapted to receive one of the inwardly extending flanges 232 of a keeper band 234. The reinforcing rings 228 may be integral or split and if split they will be held in position by the keeper band 234.

With either form of reinforcing ring the flanges 232 of the keeper band 234 cooperating with the slots 230 in reinforcing rings 228 will limit the axial extension which can take place between adjacent rings. In certain installations this is important to prevent over-stroking and eventual breaking of the flexible member.

Two forms of keeper band 232 are shown in Figures 20 and 21, namely, keeper band 234 and keeper band 234a. Keeper band 234 is shown as having a substantially complete circular circumference at one point of which the ring is broken. This form of the ring is applied by springing apart the free ends 236 and 238 and then slipping the ring over a pair of assembled reinforcing rings 228. The keeper band 234a is illustrated as being formed in two complementary portions with flanges 240 and 242 formed at the free ends thereof which flanges may be suitably joined such as by welding or bolting to form a complete ring.

Figure 22 illustrates the application of a flared guide sleeve 244 to an expansion joint using non-interlocking reinforcing rings 246. If desired, the guide sleeve 244 may be held in position on the assembly by means of a screw 248 which passes through the sleeve 244 and is threaded into one of the reinforcing rings 246. This type of non-interlocking reinforcing ring in itself will not limit lateral distortion and it is seen therefore that the use of a guide sleeve 244 is very useful in such an installation.

There has been provided an expansion joint assembly which is capable of partaking of all possible types of motion between two conduit portions and which is capable of limiting one or more of these motions. The interlocking rings will provide limited axial compression, lateral offset motion, radial bending and lateral distortion. The use of a clamping ring with lateral interlocking reinforcing rings positively limits lateral extension. The provision of a guide sleeve positively limits lateral distortion or "blow out" and in the case of a flared guide sleeve still permits the other types of motion.

All the forms of interlocking reinforcing rings shown completely surround and protect the relatively fragile corrugated flexible tube and thereby protect the tube from accidental blows from wrenches or the like. Should the flexible tube rupture under high pressure the material contained in the tubing will not issue as a steady stream but instead will tend to be diffused relatively slowly between the overlapping flanges. This feature may be extremely important in the case of high temperature fluids or corrosive fluids.

When interlocking reinforcing rings are used any motion of the rings when moving from one position to another is transmitted from ring to ring and thus eliminates the necessity of the rings being shifted into their new position by the flexible tube. This results in less wear on the corrugated flexible tube and permits the use of a lighter tube structure for a given pressure.

Certain forms of invention may be formed by inexpensive methods of fabrication such as spinning or stamping and thus the resulting expansion joint assembly can be produced very economically.

The use of integral rings or mutually interlocking rings eliminates the necessity of using bolts and associated parts for assembling the reinforcing rings about the flexible member and thus reduces the cost of the installation and obviates difficulties outlined above. The elimination of bolts and flanges in turn permits the use of guide sleeves which, as pointed out above, positively limits lateral distortion or "blow out."

The use of split interlocking rings either alone or with clamping rings makes it possible to apply reinforcing rings to a corrugated member while it is positioned in a conduit and likewise allows the replacement of broken or injured reinforcing rings. In addition the clamping rings serve as an extension limiting element and therefore may be used with integral rings for this purpose.

It is obvious that various changes may be made in the specific embodiment set forth without departing from the spirit and scope of the invention. The invention is accordingly not to be limited to the specific embodiments shown and described, but only as indicated in the following claims.

The invention is hereby claimed as follows:

1. The method of making a reinforced flexible conduit, which method comprises forming a pair of ring sections each with a radial annular portion and an outer flange projecting laterally therefrom, forming a reinforcing ring by coaxially joining said ring sections with the radial annular portions in abutting relation and with the flanges projecting in opposite directions and radially offset such that the inner diameter of the outer flange substantially corresponds with the outer diameter of the inner flange, placing a plurality of such reinforcing rings in predetermined spaced relation on a tubular conduit, and collapsing the conduit with outward formation of a corrugation between adjacent reinforcing rings which approach one another to telescope the flanges of adjacent rings.

2. The method as claimed in claim 1, wherein the forming of the ring sections includes the forming of beveled inner edges on the radial annular portions and wherein the forming of the reinforcing rings includes the joining of the ring sections with the inner edges of the radial annular portions thereof coinciding to present a contoured surface substantially matching the adjacent surface of the trough of a conduit corrugation.

3. The method as claimed in claim 1, wherein the forming of the reinforcing rings includes folding back the inner edge of the radial annular portion of one ring section of each reinforcing ring and providing a larger opening in the other cooperating ring section to accommodate the folded inner edge of the adjacent ring section and present a contoured surface substantially matching the adjacent surface of the trough of a conduit corrugation.

References Cited in the file of this patent

UNITED STATES PATENTS

| Number | Name | Date |
| --- | --- | --- |
| 337,037 | White | Mar. 2, 1886 |
| 1,320,430 | Wheeler | Nov. 4, 1919 |
| 1,821,702 | Freeman | Sept. 1, 1931 |
| 1,826,666 | Lawrence | Oct. 6, 1931 |
| 1,964,289 | Harrah | June 26, 1934 |
| 2,016,247 | Simmons | Oct. 1, 1935 |
| 2,036,417 | Laird | Apr. 7, 1936 |
| 2,044,711 | Mantle | June 16, 1936 |
| 2,137,712 | Bratz | Nov. 22, 1938 |
| 2,187,347 | Grarnaschelli | Jan. 16, 1940 |
| 2,240,694 | Gamble | May 6, 1941 |
| 2,243,522 | Conklin | May 27, 1941 |
| 2,323,985 | Fausek et al. | July 13, 1943 |
| 2,444,192 | Giesler | June 29, 1948 |
| 2,489,844 | Zallea et al. | Nov. 29, 1949 |
| 2,490,513 | Dreyer | Dec. 6, 1949 |

FOREIGN PATENTS

| Number | Country | Date |
| --- | --- | --- |
| 694,163 | Germany | Aug. 23, 1940 |
| 708,788 | France | May 5, 1931 |